UNITED STATES PATENT OFFICE.

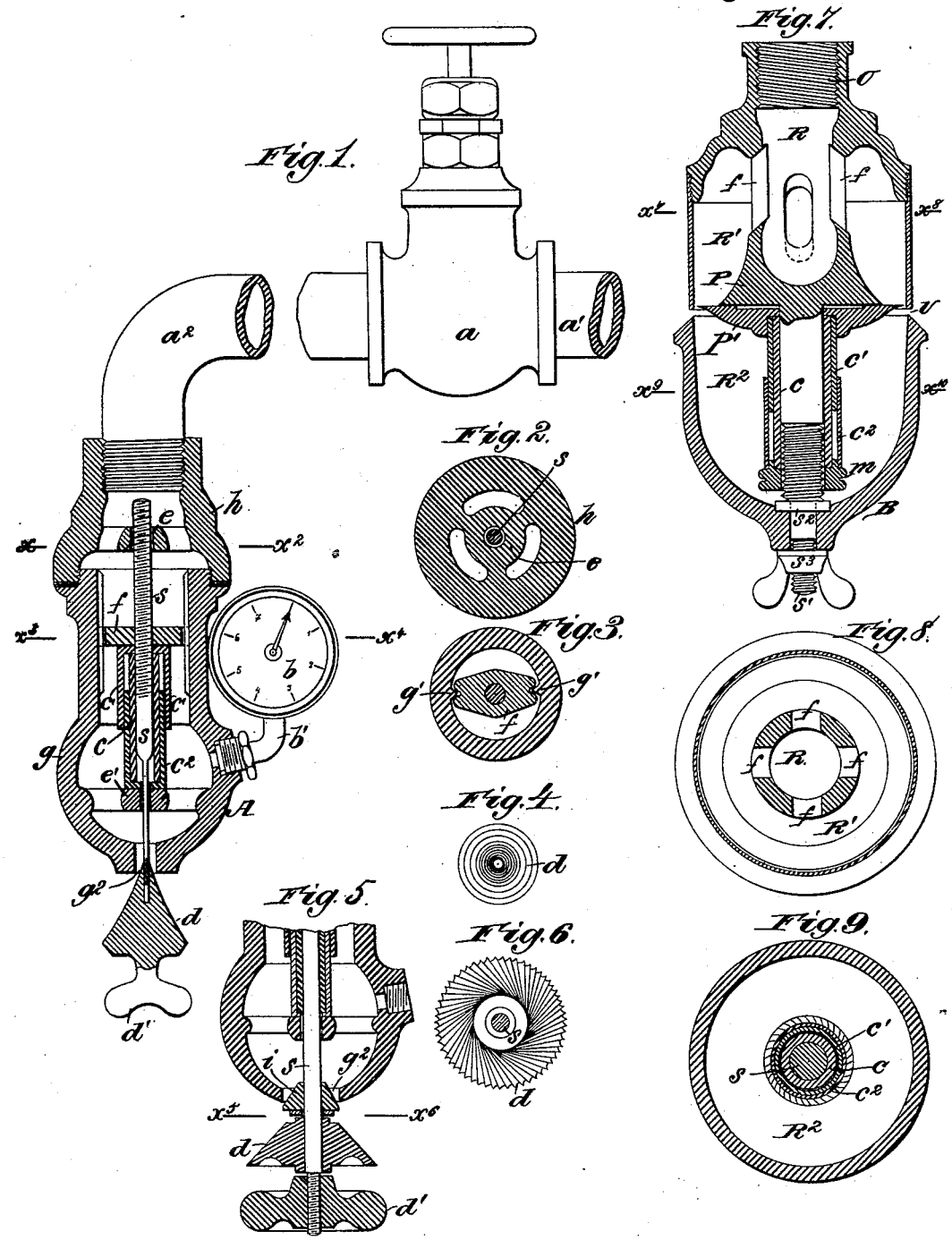

FRANCIS FAYOD, OF ZURICH, SWITZERLAND, AND HEINRICH MESTERN, OF MUNICH, GERMANY.

COOLING DEVICE.

SPECIFICATION forming part of Letters Patent No. 434,633, dated August 19, 1890.

Application filed December 12, 1889. Serial No. 333,508. (No model.) Patented in Switzerland September 22, 1889, No. 1,451.

*To all whom it may concern:*

Be it known that we, FRANCIS FAYOD, a citizen of the Republic of Switzerland, residing at Zurich, Switzerland, and HEINRICH MESTERN, a subject of the Emperor of Germany, residing at Munich, in the Kingdom of Bavaria, German Empire, have invented certain new and useful Improvements in Cooling Devices, (for which Letters Patent have been granted by the Republic of Switzerland, No. 1,451, dated September 22, 1889;) and we do hereby declare the following to be a full, clear, and exact description thereof, reference being had to the drawings, forming part of this specification.

The invention has for its object improvements in apparatus for cooling apartments and other spaces by means of nozzles and for cooling at the same time the air confined in a room. The rose-heads used in the apparatus in question are generally known, and we shall hereinafter describe only improvements by means of which the effect is increased. The rose-heads heretofore in use producing water-spray by means of a conical or annular sprayer have the serious inconvenience that the holes or openings through which the water flows, and which of course have to be very fine apertures or a fine annular slot, are easily obstructed by the impurities contained in the water, so as to lessen or entirely prevent the intended effect of the rose.

The present invention has for its object to clear away automatically any obstructions in the openings by varying the section of the flow, and by varying thereby the velocity of flow, so that when the sprayer makes a movement the stronger-flowing stream produces a cleaning action, whereupon the sprayer turns back into its original normal position. The sprayer is provided for this purpose with an elastic rubber guide. In this kind of roses and in all roses the useful effect depends from a certain constant pressure in the rose-head. We make use here of pressure-reduction valves and of manometers for regulating and observing the pressure. A further improvement of the rose consists in the peculiarities of its construction, having the object producing a high effect at low expense of water and at moderate pressure of about one atmosphere. This effect is obtained by means of a water-jet entering centrally into the rose and which is changed before its exit into an annular jet, becoming gradually smaller and smaller till it is finally reduced by a disk into a fine annular jet. The water at its exit parts from a body of water not in motion and meets with very little friction.

In the accompanying drawings, Figure 1 is a section through the rose-head A. Fig. 2 is a horizontal section after line $x'\, x^2$, Fig. 1. Fig. 3 is a horizontal section after line $x^3\, x^4$, Fig. 1. Fig. 4 is a top view of the sprayer. Fig. 5 is a vertical section of a sprayer of another construction, and Fig. 6 shows the same in horizontal section after line $x^5\, x^6$, Fig. 5.

The water coming from the conduit $a'$ is reduced by means of the valve $a$ of ordinary construction to a certain pressure (about four atmospheres) for which the rose is constructed. From $a$ the water flows through pipe $a^2$ into the upper part $h$, and from here into the case $g$ of the rose, where it descends and escapes through the aperture $g^2$, which is throttled in a convenient way by the conical sprayer $d$, this latter exactly adjusted by means of the nut $d'$, screwing on the threaded rod $s'$, so that the fixed pressure of about four atmospheres produces a fine spray of water as soon as the water passing over $d$ escapes from $g^2$. The rod $s'$ is upward continued into rod $s$, the threaded part of which has a nut $f$, being vertically guided by ribs $g'\, g'$, Fig. 3, projecting inside from the case. The rods $s$ and $s'$ are guided in cross-bars $e$ and $e'$. A pipe end or sleeve or bushing $c'$, bearing against $f$, is fitted telescopically over another bush $c^2$, placed upon the cross-bar $e'$, so that $c'$ and $c^2$ can glide within each other. A piece of elastic rubber pipe $c$, constituting a spring, is arranged concentrically within bush $c^2$, surrounding rod $s$. Thus the said parts $c$ and $c^2$ are supported by the cross-bar $e'$. When the rose-nozzle is regulated in this way, it will work with precise accuracy under the pressure fixed in advance; but as soon as the opening $g^2$ gets obstructed by the impurities contained in the water the flow will become irregular and the working will be disturbed. However, before this can be noticeable the obstruction of the opening $g^2$ produces a slight increase in the pressure, which working upon *d* will push it downward. The push upon *d* will cause a descent of the parts *f*, *s*, and *s'*, the rubber pipe *c* yielding by its elasticity, and thus the section of flow at $g^2$ will become larger for a moment, sufficiently for the now stronger-flowing water to carry away the obstructing impurities and to clean the sprayer *d*. This being effected, the elasticity of the rubber pipe *c* pushes the nut *f* up again, so that the sprayer *d* returns into its normal position. It is obvious that the best working of the rose-nozzle is obtained at a constant pressure in the conduit-pipe *a'* and in the case *g*. The pressure in the nozzle is easily observed by means of a manometer *b*, communicating therewith by means of a short pipe *b'*. The pressure is controlled by means of valve *a*.

Fig. 5 represents the opening $g^2$ throttled by a cone *i*, placed upon the rod *s*, and the water runs upon a second cone *d*, being provided with tangential grooves, Fig. 6, which break the water-jets and produce a better spraying for the purpose of moistening air. The cones *d* and *i* can be placed higher or lower by turning the screw-nut *d'*. The rest of the disposition is the same as above described.

Fig. 7 shows a rose-nozzle B in section, (vertically,) and Figs. 8 and 9 are horizontal sections after lines $x^7 x^8$ and $x^9 x^{10}$, respectively. The water arrives through the upper end *o*, filling at first the central space R, whereupon it flows through the slots *f* into the annular chamber R'. The parabolic body P serves to diminish the section, going gradually downward, and the disk P', with its sharp-edged periphery nearly reaching the wall of the case, produces a quite fine annular jet of water, which in flowing down butts against the body of water contained in the water-chamber $R^2$ below. The direction of the water is averted thereby, and it leaves the rose-nozzle through the opening *v* in a conical form. By the disposition of the gradual charge of the full water-jet into the fine annular jet produced by the disk P', and by means of averting nearly without any friction the vertically-directed jet into a horizontal or conical jet, this rose-nozzle, used for the purpose of ventilation, produces a greater effect. The disk P is so arranged as to be displaced vertically, in order to give it an exact position with regard to the opening *v*. It rests, therefore, upon the pipe end *c'*, sliding in the pipe end or bush $c^2$, both inclosing the rubber pipe *c*, which rests upon the nut *m* on spindle *s*. The latter is secured in the case by means of its collar $s^2$ and thumb-nut $s^3$. An obstruction will here produce, in a similar manner as above described, an automatic cleaning, for the increased pressure working upon disk P' pushes it down, thereby increasing the section of the outlet-opening, and the stronger-flowing water carries away the impurities, whereupon P' goes up again under the influence of the elasticity of rubber pipe *c*.

Having thus fully described our invention, we claim as new and desire to secure by Letters Patent—

1. In a nozzle, the two telescopic sleeves C' $C^2$ and the rubber tube or bushing within them, in combination with a fixed cross-bar, on which they rest, a movable cross-bar, which rests on said sleeves and rubber tube, a rod, which is attached to said movable cross-piece and passes through said fixed one, and a sprayer attached to said rod, the said sprayer being arranged to leave the end of the nozzle normally open, substantially as set forth.

2. In combination with a nozzle-body and a sprayer partly closing the end thereof, a stem for said sprayer, extending up within said nozzle-body, a rubber tube fitting upon said sprayer-stem, a fixed part of the nozzle below said tube, and two telescopic sleeves concentric with said rubber tube, the upper sleeve being attached to said rod, the lower sleeve being supported on said fixed part of said nozzle, and one of said sleeves fitting on said rubber tube, substantially as set forth.

3. In combination with a nozzle-body having a spray-opening, a sprayer partly closing said opening, a rod extending from said sprayer within said nozzle-body, a spring supported on a fixed attachment of said nozzle-body, and a cross-piece resting on said spring and adjustable on said rod to regulate the pressure of said spring, the latter consisting of a rubber tube inclosed within telescopic boxes and fitting on said rod, substantially as set forth.

FRANCIS FAYOD.
HEINRICH MESTERN.

Witnesses:
H. LOBHARK,
A. C. CHOMAIN.